(12) United States Patent
Chih-Chang et al.

(10) Patent No.: US 6,228,517 B1
(45) Date of Patent: May 8, 2001

(54) STRUCTURE FOR SHARING BATTERIES

(76) Inventors: Chang Chih-Chang, 7F-5, No. 62, Sec. 2, Chung-Shan Road, Pan-Chiao City, Taipei Hsien; Liu Te-Chang, No. 7, Lane 49, Kuang-Hul Road, Taipei, both of (TW)

( * ) Notice: Subject to any disclaimer, the term of this patent is extended or adjusted under 35 U.S.C. 154(b) by 0 days.

(21) Appl. No.: 09/312,093

(22) Filed: May 15, 1999

(51) Int. Cl.[7] .................................................. H01M 2/10
(52) U.S. Cl. ............................... 429/9; 429/96; 429/100; 429/7
(58) Field of Search .............................. 429/7, 9, 96, 100

(56) References Cited

U.S. PATENT DOCUMENTS

| | | | |
|---|---|---|---|
| 4,737,420 | * 4/1988 | Ikeda et al. ........................... | 429/1 |
| 5,071,716 | * 12/1991 | Petzl et al. ........................... | 429/9 |
| 5,733,674 | * 3/1998 | Law et al. ........................... | 429/9 |

* cited by examiner

*Primary Examiner*—Stephen Kalafut
*Assistant Examiner*—Angela J. Martin

(57) ABSTRACT

A structure for sharing batteries comprises a No. 1 battery converter, a No. 2 battery converter, and a No. 3 battery converter. The No. 3 battery converter may be inserted by a No. 4 battery so as to be used as a No. 3 battery. The No. 2 battery converter may be inserted by a No. 3 battery so as to be used as a No. 2 battery. The No. 2 battery converter may be inserted by a No. 1 battery so as to be used as a No. 1 battery. The No. 1 battery converter may be inserted by a No. 3 battery so as to be used as a No. 1 battery. Thus, the batteries can be used conveniently. Moreover, the No. 3 battery converter is inserted into the No. 2 battery converter, and then the No. 2 battery converter is inserted into the No. 1 battery converter so as to be easily stored and carried.

7 Claims, 7 Drawing Sheets

STRUCTURE FOR SHARING BATTERIES

FIELD OF THE INVENTION

The present invention relates to a battery casing structure, and more specifically to a structure for sharing batteries of different sizes.

BACKGROUND OF THE INVENTION

Batteries commonly used in electronic devices are classified as size D, size C, size AA and size AAA. An electronic device powered by batteries usually has a battery compartment for housing batteries of a specific size. In general, a battery of a larger size can not be fit into a battery compartment designed for smaller batteries. Although batteries of a smaller size may be housed in a battery compartment designed for larger batteries, the smaller batteries generally can not be used to supply power because the power supply path can not be properly connected.

For environmental protection concern, rechargeable batteries have become very popular and widely used. Similar to the conventional non-rechargeable batteries, a general inconvenience in using the rechargeable batteries is that if the power of batteries of a specific size has been exhausted, batteries of a different size can not be used even if they are available. Because batteries of smaller sizes can actually be accommodated in a battery compartment designed for larger batteries, it is desirable that batteries of smaller sizes be adapted to substitute for the larger batteries when necessary.

Taiwan Patent Publication No. 228968 discloses a "Battery Converting Box" which provides a structure for converting the size of a battery so that it can be used to replace a battery of a different size. By means of the battery converting box, a smaller battery can be directly embedded in the box so as to be used as a large battery. However, the converting box has several drawbacks in that it has a complicated structure and requires high cost to manufacture. In addition, the operation of the box is not convenient.

There is a strong need in providing a simple and low cost structure for converting batteries of smaller sizes so that they can be used as batteries of larger sizes.

SUMMARY OF THE INVENTION

The primary object of the present invention is to provide a casing structure for converting and sharing batteries of different sizes. Accordingly, the invention provides a first battery converter for converting a size C battery to a size D battery, a second battery converter for converting a size AA battery to a size C battery, and a third battery converter for converting a size AAA battery to a size AA battery.

The first battery converter comprises an upper case and a lower case. One end of the upper case has a hole so that the positive electrode of a battery can be protruded through. The other end of the upper case has a neck portion which can be inserted into the lower case. The bottom of the lower case has a conductive piece to seal the bottom and a conductive spring to support a battery. The inner diameters of the upper and lower cases are large enough to house a size C battery. A circular wall is formed on the bottom of the lower case so that a size AA battery can also be received directly.

The second battery converter also comprises an upper case and a lower case. The upper case is similar to the upper case of the first battery converter except for a smaller size. The bottom of the lower case has a through hole and a plurality of elastic clamping pieces for clamping and holding a size AA battery.

The third battery converter also comprises an upper case and a lower case. The upper case is also similar to the upper case of the first battery converter except for a smaller size. The bottom of the lower case has a conductive piece to seal the bottom and a conductive spring to support a size AAA battery. The inner diameters of the upper and lower cases are large enough to house a size AAA battery.

According to the present invention, the third battery converter can be inserted into the second battery converter to convert a size AAA battery to a size C battery. The combined second and third battery converters can further be inserted into the first battery converter to convert the size AAA battery to a size D battery. Similarly, a size AA battery can also be converted and used as a size D battery.

Another object of the invention is to provide a casing structure that can be stored and carried compactly and conveniently. Accordingly, the third battery converter can be inserted into the second battery converter that can be further inserted into the first battery converter so as to be conveniently stored and carried.

The various objects and advantages of the present invention will be more readily understood from the following detailed description when read in conjunction with the accompanying drawings.

DETAILED DESCRIPTION OF THE PREFERRED EMBODIMENTS

Figure 1:
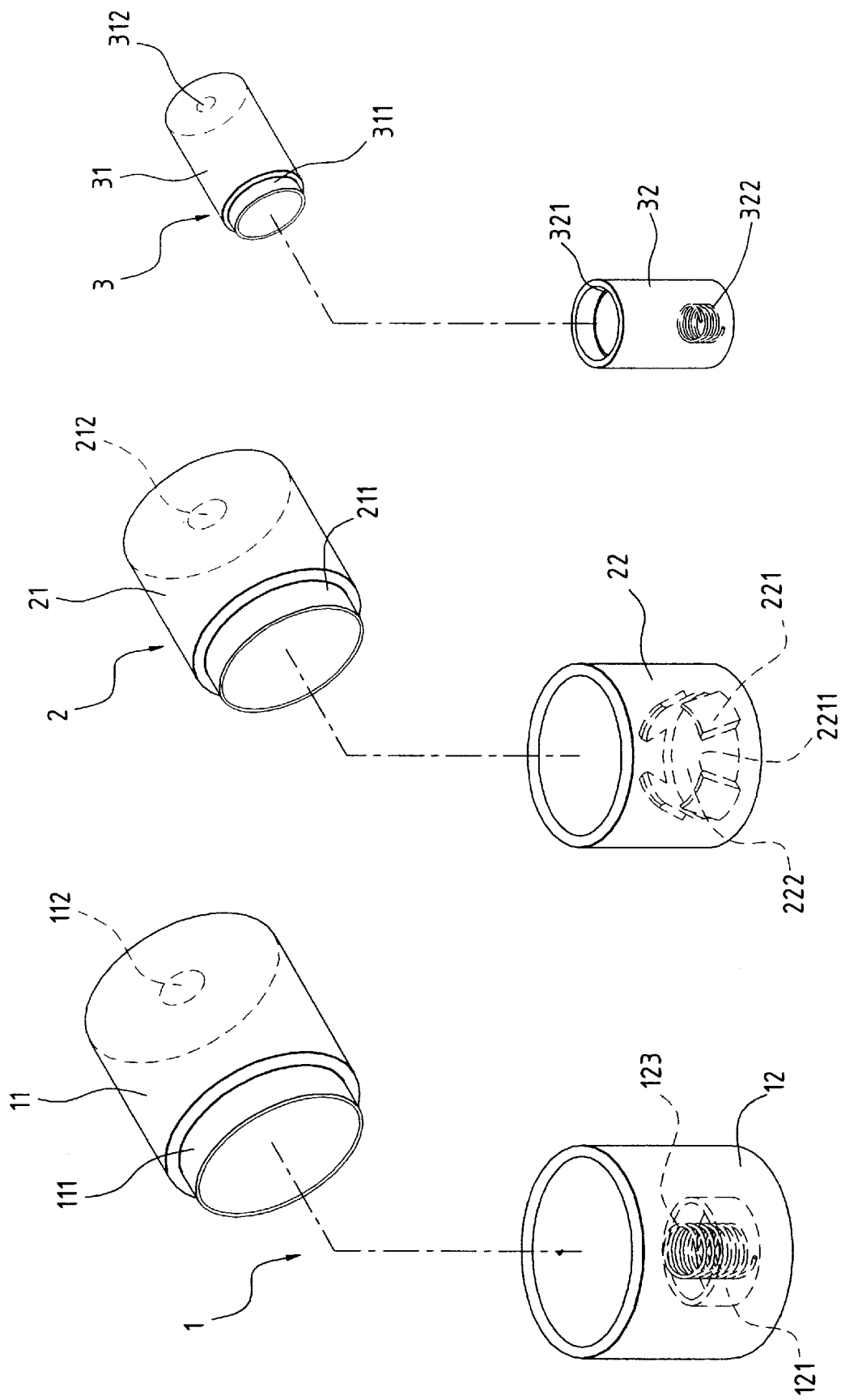
FIG. 1 is an exploded perspective view of first, second, and third battery converters of the present invention.

With reference to FIG. 1, the casing structure for sharing batteries of different sizes according to the present invention is illustrated. The structure comprises a first battery converter 1 for converting a battery into a size D battery, a second battery converter 2 for converting a battery into a size C battery, and a third battery converter 3 for converting a battery into a size AA battery.

The first battery converter 1 includes an upper case 11 and a lower case 12. The upper case 11 is formed with a hollow cylinder with one end having an opening. The other end of the upper case 11 is formed with a hole 112 having a diameter slightly larger than that of the positive electrode of a size C battery. The inner diameter of the upper case 11 is large enough to receive a size C battery. The periphery around the opening of the upper case 11 is formed with a neck portion 111 which has an outer diameter slightly larger than the inner diameter of the lower case 12 so that the neck portion 111 can be forced into the lower case 12.

Figure 3:
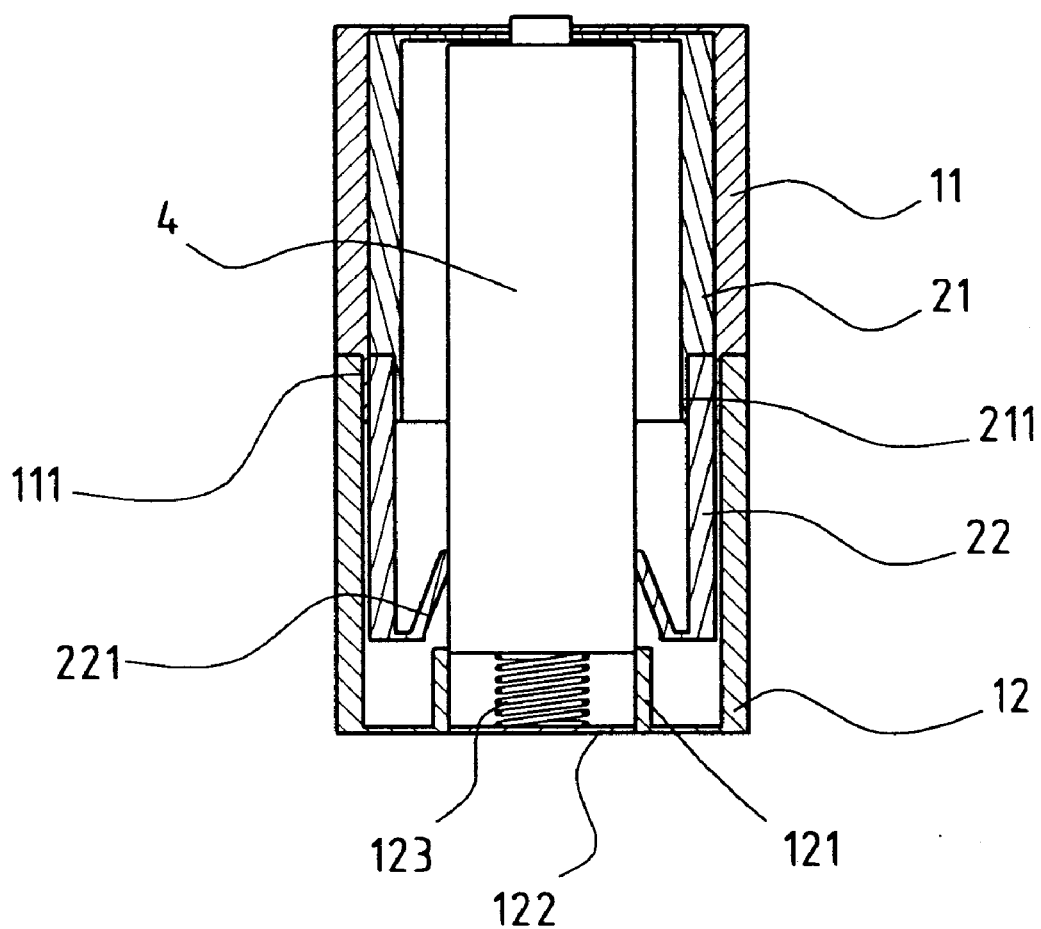
FIG. 3 is a cross sectional view showing an embodiment in which the second battery converter containing a size AA battery is further inserted into the first battery converter so that the size AA battery can be used as a size D battery according to the present invention.

The lower case 12 of the first converter 1 is a hollow cylinder whose one end has an opening. The inner bottom is installed with a circular wall 121. The circular wall 121 can receive a size AA battery. The bottom of the circular wall 121 is installed with a conductive piece 122 as shown in FIG. 3 so that the conductive piece 122 seals the bottom of the lower case 12. The conductive piece 122 is further welded with a conductive spring 123. In a preferred embodiment, the conductive spring 123 is a compressible spring.

The second battery converter 2 also includes an upper case 21 and a lower case 22. The upper case 21 is formed with a hollow cylinder with one end having an opening. The other end of the upper case 21 is formed with a hole 212 having a diameter slightly larger than that of the positive electrode of a size AA battery. The periphery around the opening of the upper case 21 is formed with a neck portion 211 which has an outer diameter slightly larger than the inner diameter of the lower case 22 so that the neck portion 211 can be forced into the lower case 22.

The lower case 22 is also a hollow cylinder whose one end has an opening. The bottom of the lower case 22 is formed with a through hole 222 which is larger than the outer diameter of a size AA battery. The inner diameter of the through hole 222 is larger than the outer diameter of the circular wall 121. A plurality of elastic clamping pieces 221 facing the lower case 2 and inclined toward the center are formed on the periphery of the through hole 222. The edge of each elastic clamping piece is formed with a chamfered sloping surface 2211. The elastic clamping pieces 221 form a circle having an inner diameter smaller than the outer diameter of a size AA battery 4 as shown in FIG. 3. In a preferred embodiment, the elastic clamping pieces 221 are integrally combined to the periphery of the through hole 222 of the lower case 22.

The third battery converter 3 includes an upper case 31 and a lower case 32. The upper case 31 is formed with a hollow cylinder with one end having an opening. The other end of the upper case 31 is formed with a hole 312 having a diameter slightly larger than that of the positive electrode of a size AAA battery. The upper case 31 is large enough to receive a size AAA battery. The periphery around the opening of the upper case 31 is formed with a neck portion 311 which has an outer diameter slightly larger than the inner diameter of the lower case 32 so that the neck portion 311 can be forced into the lower case 32.

Figure 5:
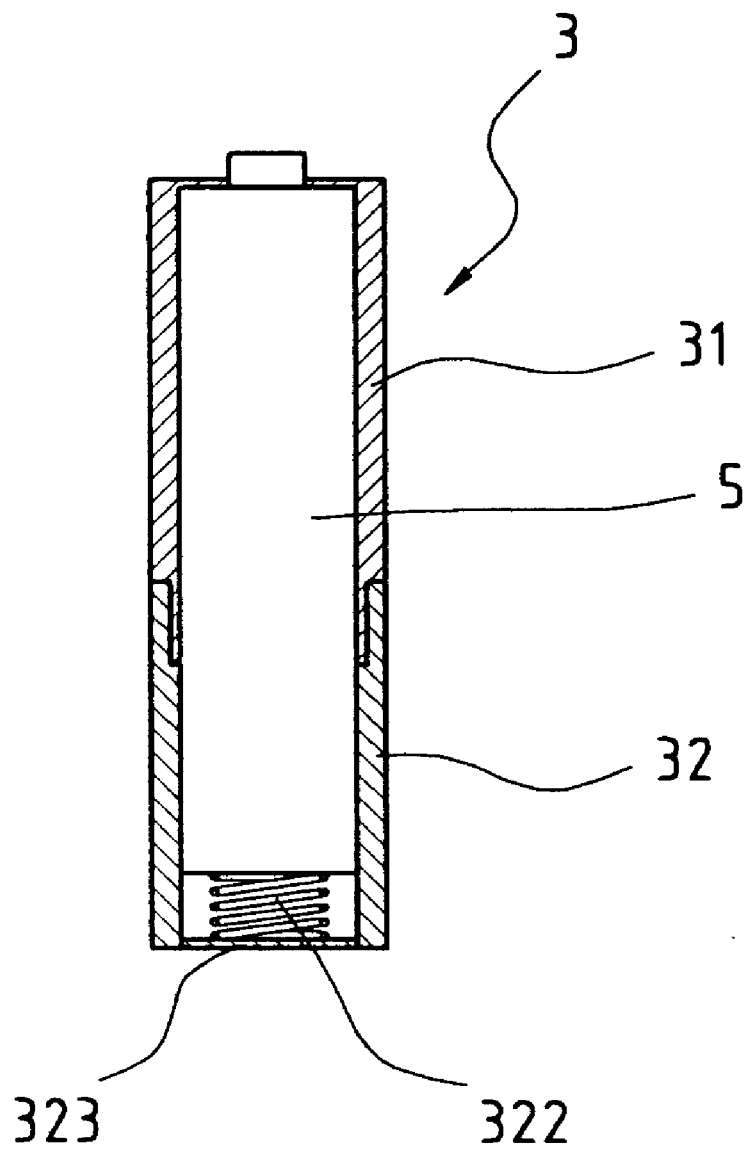
FIG. 5 is a cross sectional view showing an embodiment in which a size AAA battery is inserted into the third battery converter so as to be used as a size AA battery according to the present invention.
Figure 6:
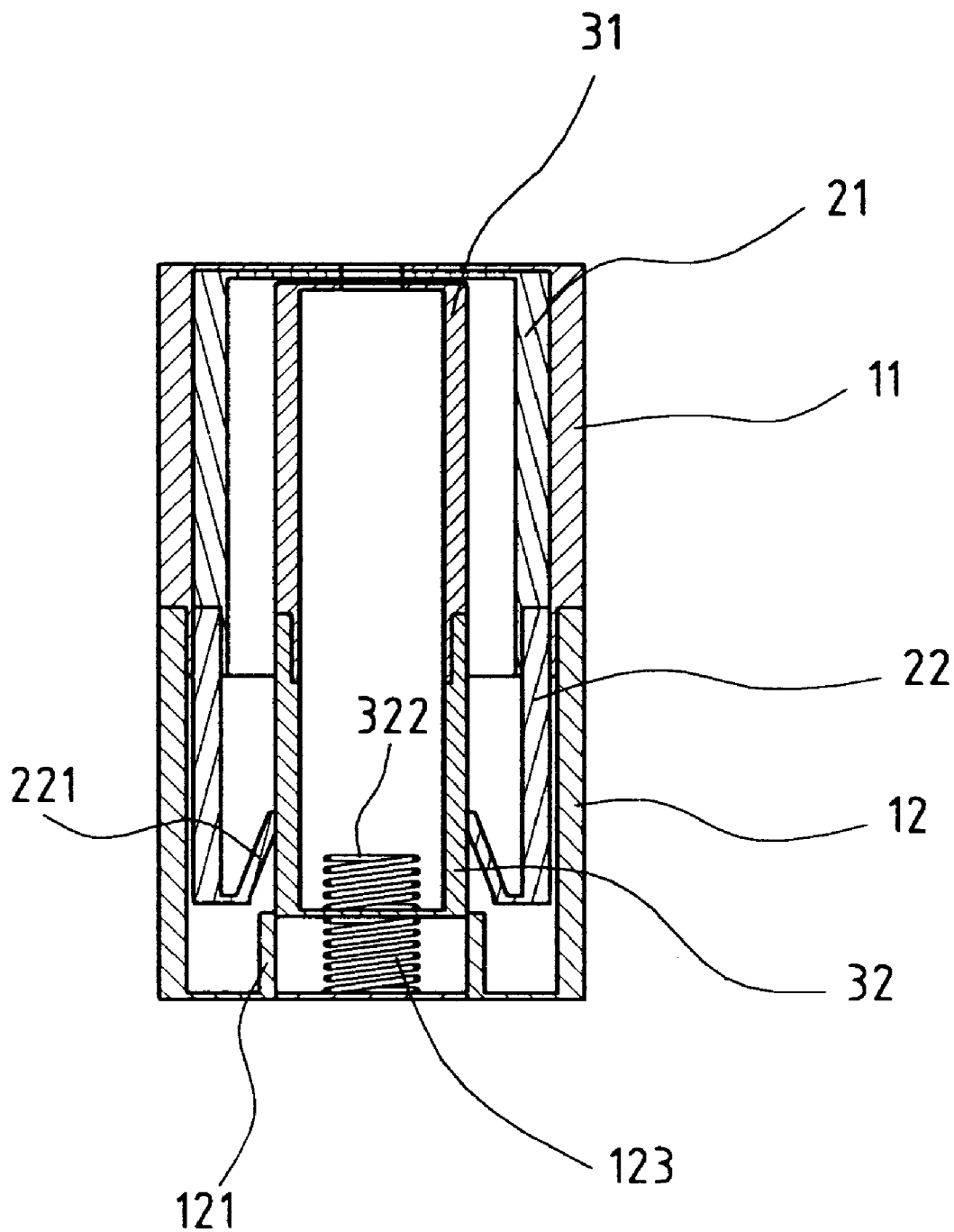
FIG. 6 is a cross sectional view showing an embodiment in which the third battery converter containing a size AAA battery is inserted into the second battery converter which is further inserted into the first battery converter so that the size AAA battery can be used as a size D battery according to the present invention.

The lower case 32 of the third converter 3 is a hollow cylinder whose one end has an opening. The lower case 32 can receive a size AAA battery. The bottom of the lower case 32 is installed with a conductive piece 323 as shown in FIG. 5 so that the conductive piece 323 seals the bottom of the lower case 32. The conductive piece 323 is further welded with a conductive spring 322. In a preferred embodiment, the conductive spring 322 is a compressible spring.

Figure 2:
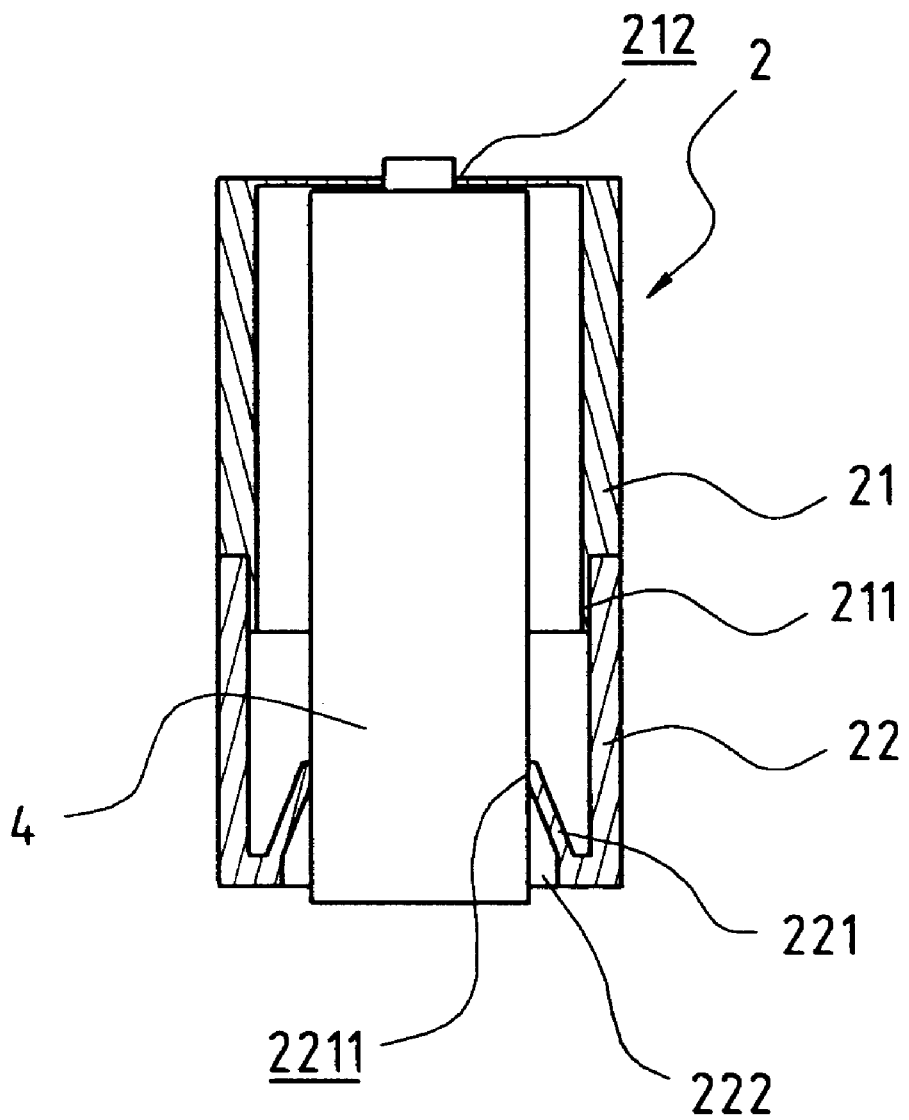
FIG. 2 is a cross sectional view showing an embodiment in which a size AA battery is inserted into the second battery converter so as to be used as a size C battery according to the present invention.

By means of the above casing structure, if a size AA battery is to be converted into a size C battery, the lower end of a size AA battery passes through the through hole 222 in the lower case 22 of the second battery converter 2. Because the edges of the elastic clamping pieces 221 have chamfered inclined surfaces 2211, a size AA battery is clamped and held therein when it is inserted into the through hole 222. The negative electrode end of the size AA battery 4 is slightly protruded outside the through hole 222 of the lower case 22 as shown in FIG. 2. The neck portion 211 of the upper case 21 is inserted into the lower case 22 so as to be fixed therein. The positive electrode of the size AA battery 4 protrudes through the hole 212 of the upper case 21 as shown in FIG. 2 so that it can be used as a size C battery.

If a size AA battery 4 is to be converted into a size D battery, two methods can be adapted. In one method, the size AA battery 4 is first assembled in the second battery converter 2 as described above. The lower case 22 of the second battery converter 2 is then inserted into the lower case 12 of the first battery converter 1 as shown in FIG. 3. The neck portion 111 of the upper case 11 of the first battery converter 1 is then forced into the lower case 12 of the first battery converter 1 so that the positive electrode of the size AA battery is protruded through the hole 112 formed on the upper case 11. The negative end of the size AA battery 4 is in contact with the conductive spring 123 of the first battery converter 1.

Figure 4:
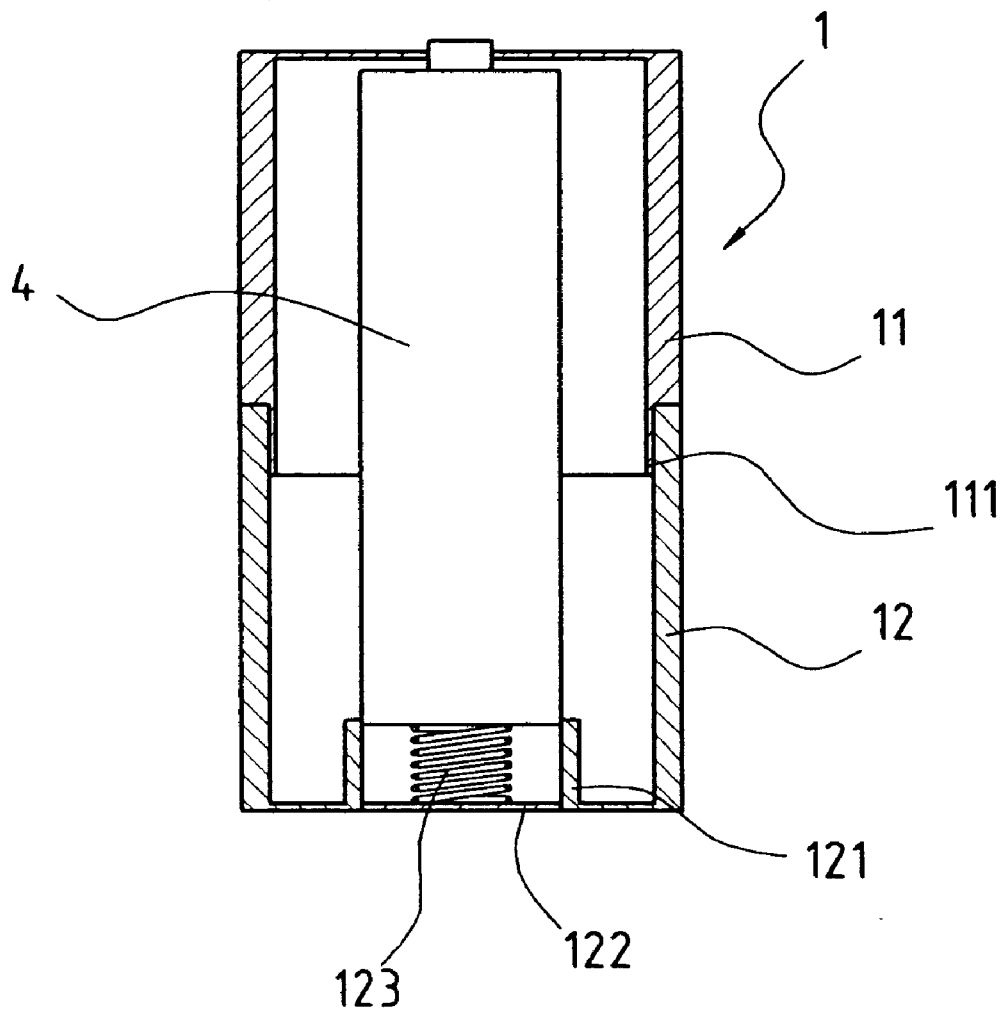
FIG. 4 is a cross sectional view showing an embodiment in which a size AA battery is inserted directly into the first battery converter so as to be used as a size D battery according to the present invention.

In the other method, the negative electrode end of the size A battery is inserted directly within the circular wall 121 formed at the bottom of the lower case 12 of the first battery converter 1 as shown in FIG. 4. The neck portion 111 of the upper case 11 is then forced into the lower case 12. The positive electrode of the size AA battery 4 is protruded through the hole 112 of the upper case 11 while the negative end contacts the conductive spring 123 as shown in FIG. 4 so that it can be used as a size D battery.

If a size AAA battery 5 is to be converted into a size AA battery, the size AAA battery can be inserted into the lower case 32 of the third battery converter 3. The neck portion 311 of the upper case 31 is inserted into the inner rim 321 of the lower case 32 so as to be fixed. The positive electrode of the size AAA battery 5 is protruded through the hole 312 of the upper case 31 while the negative electrode of the size AAA battery is in contact with the conductive spring 322 as shown in FIG. 5.

According to the invention, the storage of the casing structure is very easy and compact. After assembling the upper case 31 and the lower case 32 together, the third battery converter 3 can be inserted into the lower case 22 of the second battery converter 2. The upper case 21 can then be assembled with the lower case 22 so that the second battery converter 2 can be inserted into the lower case 12 of the first battery converter 1. Finally, the upper case 11 and the lower case 12 can be further assembled together. The whole casing structure has a small volume and can be stored and carried conveniently.

Figure 7:
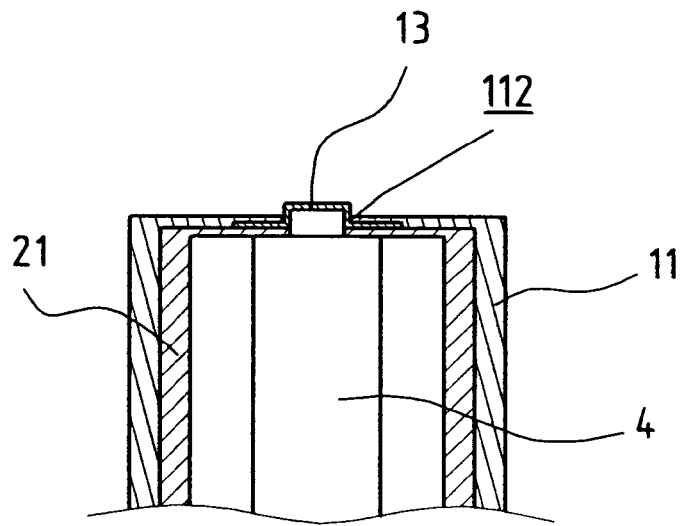
FIG. 7 is a partial cross sectional view showing an embodiment in which a conductive cap is installed against the hole of the upper case of the first battery converter for receiving a size AA battery contained in the second battery converter so that the positive electrode of the size AA battery can be contacted to provide power.

When a size AA battery 4 is inserted into the second battery converter 2 which is further inserted into a first battery converter 1, the positive electrode of the AA battery 4 may be too short to be protruded through the hole 112 for contact. FIG. 7 shows an embodiment of this invention in which a conductive cap 13 with a recess on the lower end is installed against the hole 112 of the upper case 11. The length of the conductive cap 13 protruded through the upper case 11 is equal to the length of the positive electrode of a size D battery. After the size AA battery 4 is inserted into the second battery converter 2 which is further inserted into the first battery converter 1, the positive electrode of the size AA battery 4 is inserted into the recess of the conductive cap 13 so as to be contacted and the size AA battery can be used as a size D battery.

Figure 8:
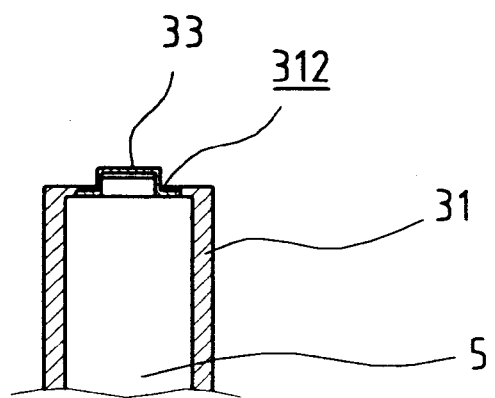
FIG. 8 is a partial cross sectional view showing an embodiment in which a conductive cap is installed against the hole of the upper case of the third battery converter for receiving a size AAA battery so that the positive electrode of the size AAA battery can be contacted to provide power.

As shown in FIG. 8, a conductive cap 31 may also be provided for the third battery converter 3. The conductive cap 31 can be installed against the hole of the upper case of the third battery converter 3. When a size AAA battery is inserted into the third battery converter 3, the positive electrode of the size AAA battery is inserted into the bottom recess of the conductive cap 31. Therefore, the positive electrode of the size AAA battery can be contacted by means of the conductive cap 31 and the size AAA battery can be used as a size AA battery.

Although the present invention has been described with reference to the preferred embodiments, it will be understood that the invention is not limited to the details described thereof. Various substitutions and modifications have been suggested in the foregoing description and others will occur to those of ordinary skill in the art. Therefore, all such substitutions and modifications are intended to be embraced within the scope of the invention as defined in the appended claims.

A casing structure for sharing batteries of different sizes includes first, second and third battery converters for converting batteries into size D, size C or size AA batteries. A size C battery can be converted and used as a size D battery by the first battery converter. A size AA battery can be converted into a size C battery by the second battery converter. It can also be used as a size D battery by further inserting the second battery converter into a first battery converter. A size AA battery can also be inserted into a circular wall formed on the bottom of the first battery converter. A size AAA battery can be converted and used as a size AA battery by the third battery converter. The third battery converter can be inserted into the second battery converter which can be further inserted into the first battery converter to be easily stored and carried.

What is claimed is:

1. A casing structure for sharing batteries, comprising:

a first battery converter including an upper case having a first end formed with an opening and a second end with a hole, and a lower case having one end formed with an opening and the other end sealed by a conductive piece with a conductive spring affixed thereon within said lower case, said upper and lower cases together forming a container for receiving a battery of a first size;

a second battery converter including an upper case having a first end formed with an opening and a second end with a hole, and a lower case having one end formed with an opening and the other end with a through hole and a plurality of elastic clamping pieces formed around the through hole, said upper and lower cases of said second battery converter together forming a container for receiving a battery of a second size clamped and supported by said elastic clamping pieces; and a third battery converter including an upper case having a first end formed with an opening and a second end with a hole, and a lower case having one end formed with an opening and the other end sealed by a conductive piece with a conductive spring affixed thereon, said upper and lower cases of said third battery converter together forming a container for receiving a battery of a third size;

wherein said third battery converter can be received in said second battery converter, and said second battery converter can be received in said first battery converter.

2. The casing structure as claimed in claim 1, said first end of said upper case of said first battery converter further having a neck portion formed thereon, said neck portion being sufficiently large so as to be forced into the opening of said lower case of said first battery converter.

3. The casing structure as claimed in claim 1, said first end of said upper case of said second battery converter further having a neck portion formed thereon, said neck portion being sufficiently large so as to be forced into the opening of said lower case of said second battery converter.

4. The casing structure as claimed in claim 1, said first end of said upper case of said third battery converter further having a neck portion formed thereon, said neck portion being sufficiently large so as to be forced into the opening of said lower case of said third battery converter.

5. The casing structure as claimed in claim 1, said lower case of said first battery converter further having a circular wall formed around the conductive spring within said lower case for receiving a battery of said second size.

6. The casing structure as claimed in claim 1, further comprising a conductive cap for capping a positive electrode of a battery of said second size so that the capped positive electrode is protruded through the hole of said upper case of said first battery converter.

7. The casing structure as claimed in claim 1, further comprising a conductive cap for capping a positive electrode of a battery of said third size so that the capped positive electrode is protruded through the hole of said upper case of said third battery converter.

* * * * *